May 22, 1951 A. E. MOSER 2,554,118
FOUNDRY SYSTEM FOR HANDLING CASTINGS
Filed Oct. 6, 1948 4 Sheets-Sheet 2
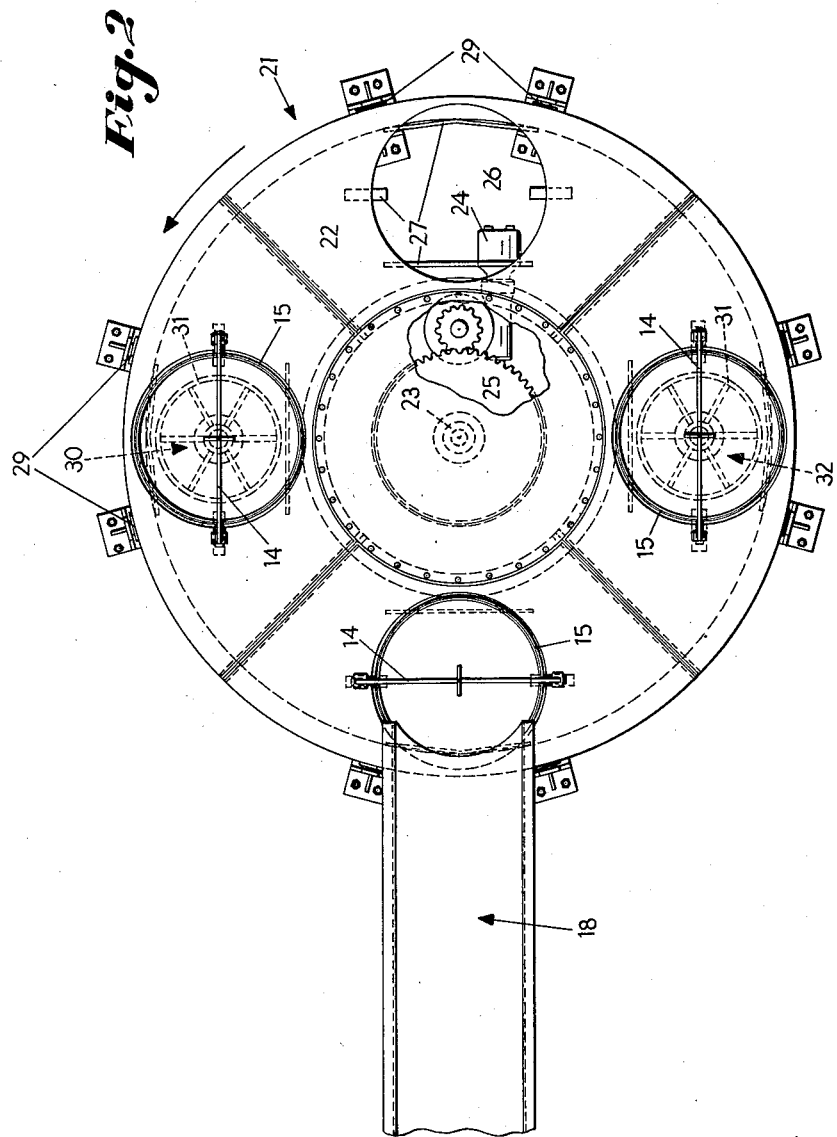
INVENTOR;
ALTON E. MOSER,
BY
ATT'Y.

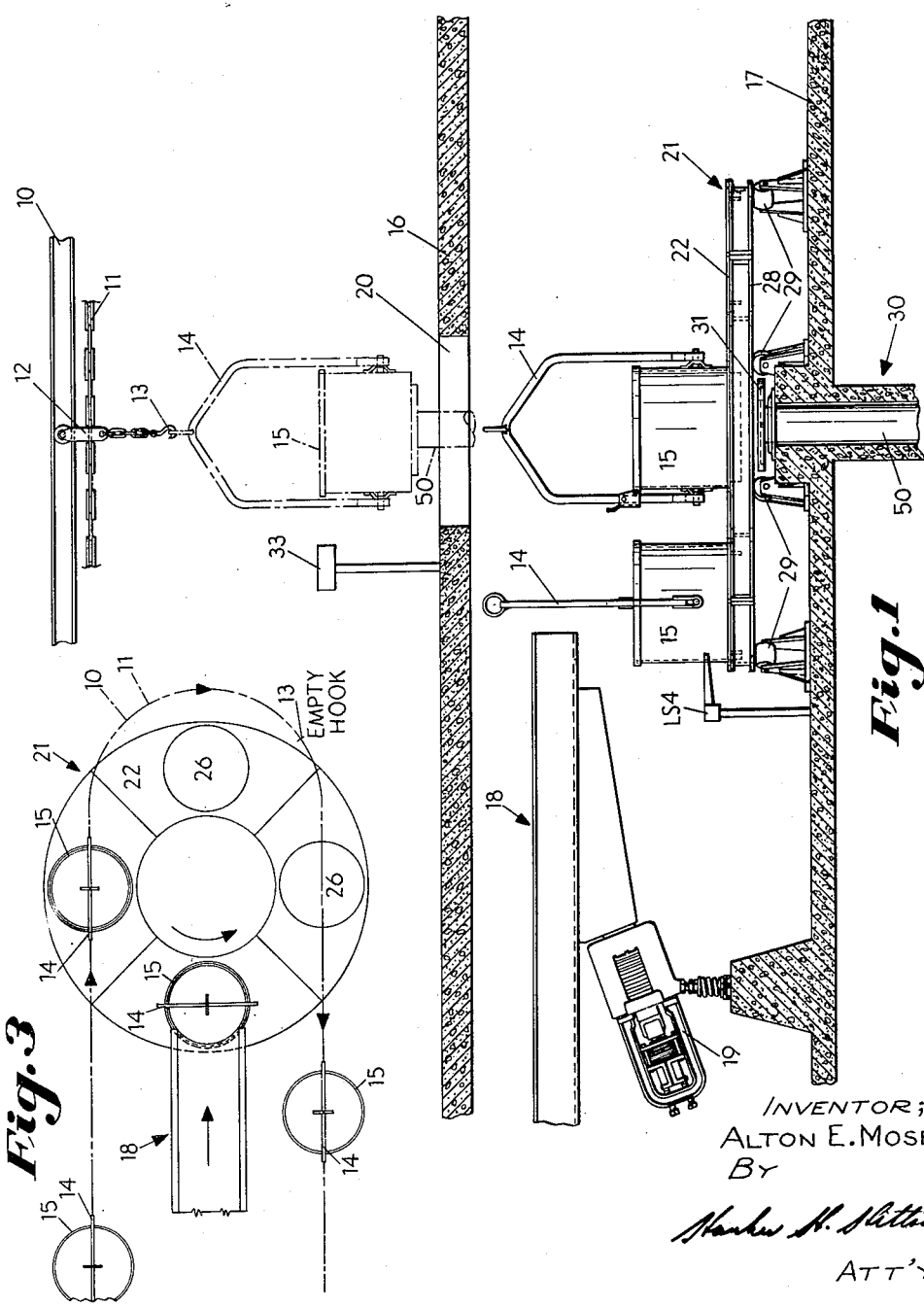

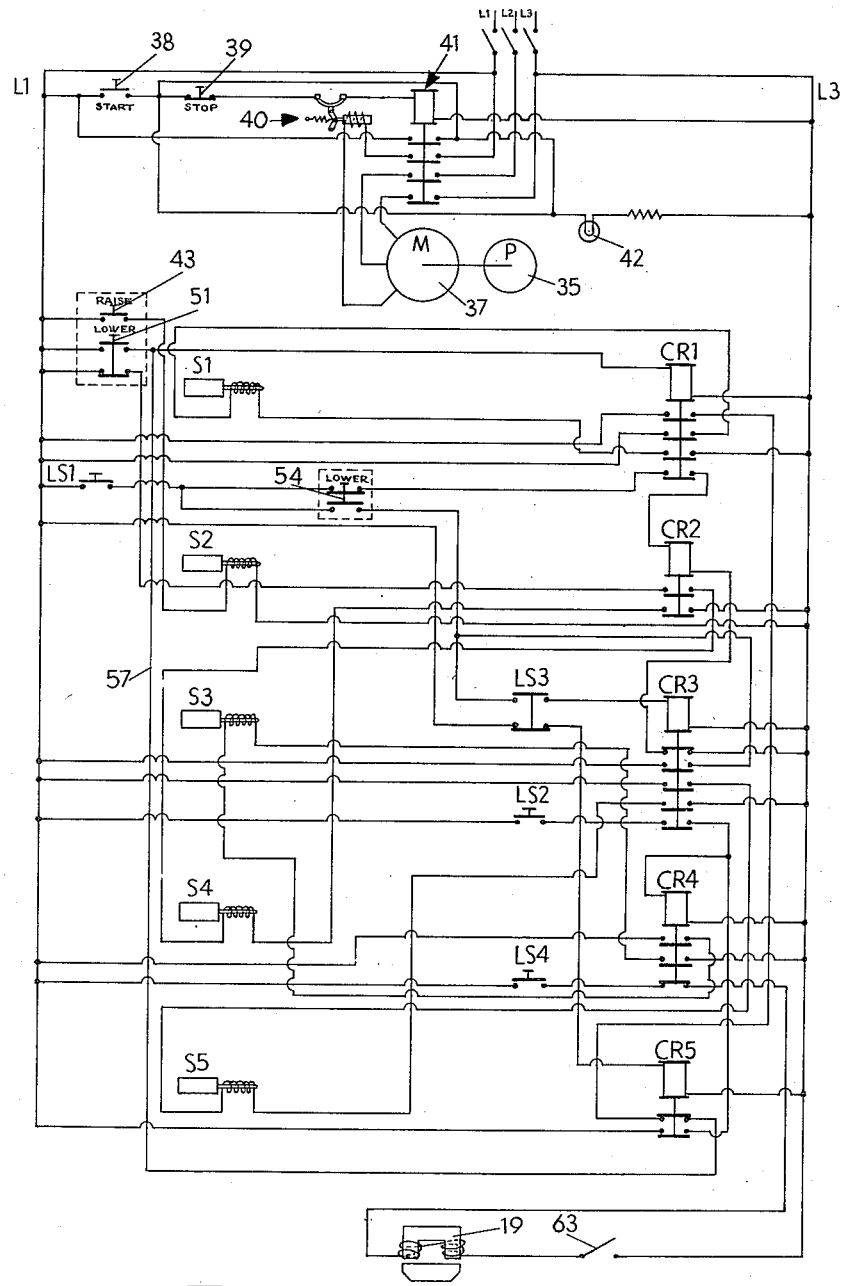

Patented May 22, 1951

2,554,118

UNITED STATES PATENT OFFICE 2,554,118

FOUNDRY SYSTEM FOR HANDLING CASTINGS

Alton E. Moser, Columbus, Ohio, assignor to The Jeffrey Manufacturing Company, a corporation of Ohio Application October 6, 1948, Serial No. 53,127

5 Claims. (Cl. 214—1)

This invention relates to a foundry system particularly for handling castings after they have been passed over a shakeout to remove sand.

An object of the invention is to provide a foundry system including particularly a trolley conveyor adapted to carry buckets of castings, including turntable mechanism constructed to receive empty buckets removed from the trolley conveyor and to fill them and return them to a position where they may be again connected to said trolley conveyor.

Another object of the invention is to provide certain safety interlocks and controls for the turntable and associated mechanism.

Other objects of the invention will appear hereinafter, the novel features and combinations being set forth in the appended claims.

In the accompanying drawings,

Fig. 1 is an elevational view showing the turntable with two of the buckets in position and its relation with the trolley conveyor;

Fig. 2 is a plan view showing the turntable with three buckets in position thereon;

Fig. 3 is a diagrammatic plan view showing particularly the positions of the various stations, the turntable, and its relative position with the trolley conveyor;

Fig. 5 is an electrical wiring diagram of the system.

Figure 4:
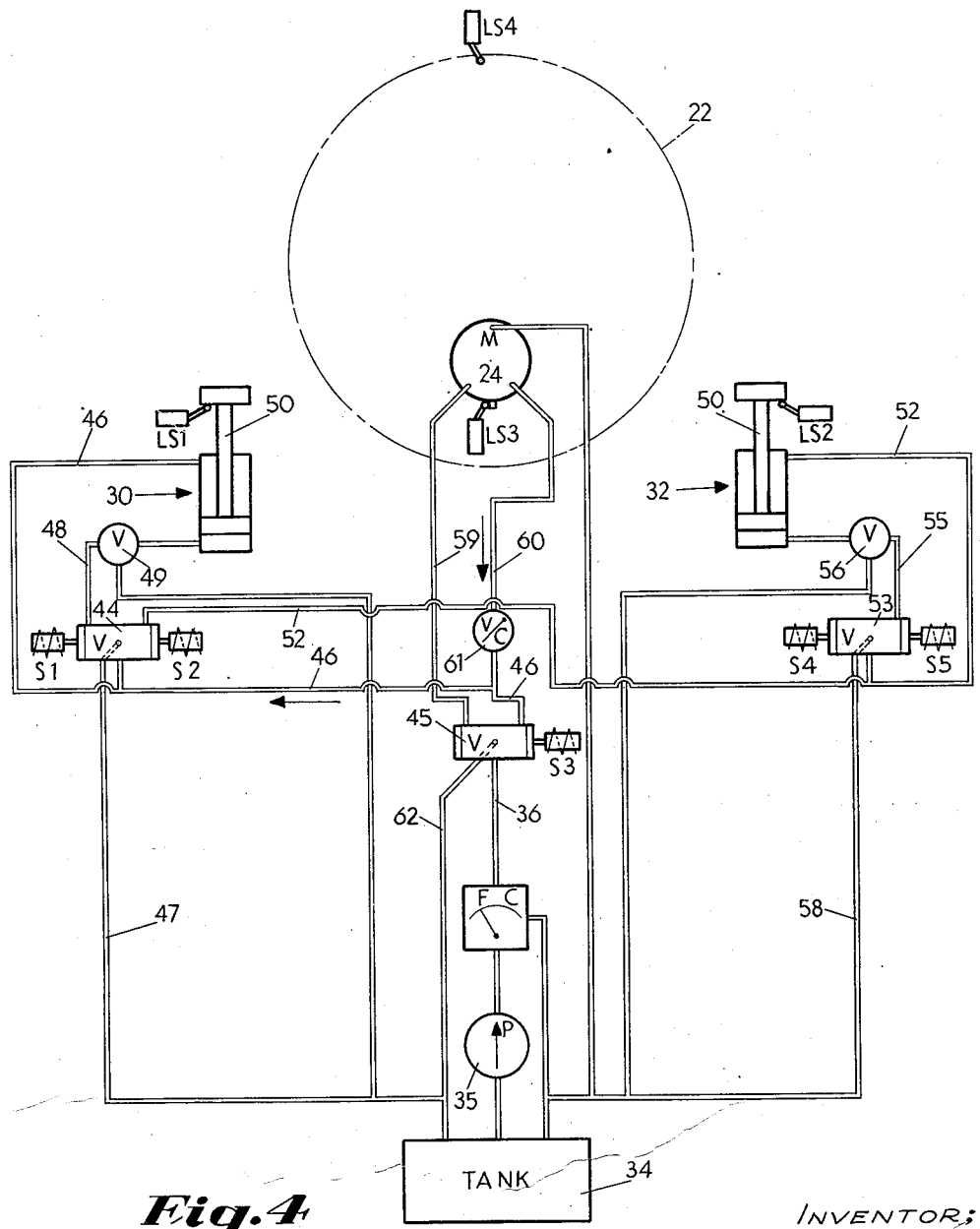
Fig. 4 is a piping diagram for the hydraulic system of various parts of the apparatus, certain limit switches also being illustrated.

As illustrated particularly in Figs. 1 and 3 of the drawings, the trolley conveyor of my foundry system includes an endless supporting rail 10 with which an endless chain 11 is associated which is supported by a plurality of spaced hangers 12 each carrying a downwardly extending chain and hook 13 adapted releasably to receive and carry the bail 14 of a pivoted bucket 15 adapted to carry castings.

As clearly illustrated in Fig. 3 of the drawings, the trolley conveyor 10, 11 makes a loop and mechanism is provided so that an operator may detach the empty buckets 15, or selected ones of them, from said trolley conveyor at one position of its travel and may attach loaded buckets to said trolley conveyor at another position of its travel.

In the operation of the system it will be understood that the castings have been formed in the molds and dumped onto a shakeout device, whereupon the molding sand will be directed in one direction, for example, through a grizzly; the castings in another direction, for example, over the grizzly. This shakeout is preferably at the floor level and consequently the castings as well as the sand will fall by gravity to a position below the floor level. The problem therefore is, of course, to get these castings from this below floor level position into the buckets of the overhead trolley conveyor.

The normal floor of the building in which the foundry system is located is designated 16. Below the floor 16 there is a pit or basement having a floor 17 within which the loading and other apparatus is located. The castings to be loaded are received from the shakeout device, not shown, and delivered to a conveyor 18 which may be of the electrovibratory type and may include one or more vibratory motors 19.

As illustrated in Fig. 3 of the drawings the two opposite runs of the trolley conveyor 10, 11 are practically parallel. Directly opposite each other and below opposite runs of said trolley conveyor there is a large circular opening in the floor 16, one of which openings is seen at 20 in Fig. 1 of the drawings. These two openings designate the empty and loaded bucket positions, respectively, of the system. That is, the empty bucket position is the position at which empty buckets are removed from the trolley conveyor, while the loaded bucket position is the position at which loaded buckets are attached to the trolley conveyor.

Midway between the empty position and the loaded position and on the arc of a circle is a loading position for the buckets in which they are loaded with castings from the conveyor 18 while sitting on a turntable, as hereinafter described. When the buckets are in their lowered positions, as illustrated in full lines in Fig. 1 of the drawings and as illustrated in Fig. 2 of the drawings, they are carried on a turntable 21 which includes a generally circular platform 22 mounted for rotation on a vertical or upright axis by a center shaft bearing 23 (see Fig. 2) and which is driven from a rotary hydraulic motor 24 which has a pinion gear meshing with a large ring gear 25, the ratio of the pinion gear to the ring gear being 4 to 1, so that for each complete rotation of the pinion of motor 24 the turntable platform 22 will make a quarter of a revolution.

The turntable platform 22 is provided with four equally spaced circular openings 26 adapted to provide recesses into which the bottoms of the buckets 15 can sit and be guided, there being supporting straps or bars 27 which effectively project inwardly from the edges of the openings 26, thereby supporting said buckets 15, while providing open center portions for the openings 26 for a purpose hereinafter described.

The periphery of the platform 22 is provided with a circular rail 28 adapted to roll on a plurality of supporting rollers 29. Below the turntable 21 and at the empty bucket position there is an elevating mechanism preferably in the form of a hydraulic ram or elevator 30. Said ram or elevator 30 has a head 31 which can project upwardly through any one of the holes 26. Said elevator 30 is employed to lower empty buckets 15 as they are released by an attendant at the empty bucket position and to lower and deposit them at said empty bucket position onto the turntable 21.

Diametrically opposite the ram or elevator 30 with respect to the turntable 21 and at the loaded bucket position there is another ram or elevator 32 which is a duplicate of elevator 30. The function of elevator 32 is to elevate loaded buckets 15 while at the loaded bucket position, thus lifting them from the turntable 21 into position to be hooked on to the trolley conveyor 10, 11 by the attendant.

Empty buckets 15 delivered to the turntable 21 at the empty bucket position are carried by the turntable 21 to the loading position adjacent the feeder 18 by rotating the turntable 90°. After the bucket 15 has been loaded at the loading position the turntable 21 will be rotated another 90° to deliver it to the loaded bucket position.

Simultaneously with rotation of a loaded bucket from the loading position to the loaded bucket position an empty bucket will move from the empty bucket position to the loading position. On the floor 16 and preferably between the two openings 20 there is a switch box 33 mounted on a pedestal and within reach of the operator who hooks the bails 14 on to the conveyer 10, 11 and unhooks them therefrom. The various manually operable switches and controls of the electrical circuit hereinafter described are contained in the switch box 33.

In Fig. 4 of the drawings the hydraulic circuit is shown together with the various control solenoids and switches of the electrical circuit of Fig. 5. Both the hydraulic and electrical circuits will be described principally in conjunction with a description of one cycle of operation of the system.

The hydraulic circuit includes a tank 34 for the hydraulic fluid and a pump 35 which derives fluid from the tank 34 and delivers it to a pressure conduit, pipe or line 36 through a volume flow control valve designated FC which is of standard construction and may be manually adjusted to provide any predetermined volume of hydraulic fluid flow in the pressure line 36.

Referring particularly to Fig. 5 of the drawings it will be seen that the electrical circuit includes three lines designated L1, L2 and L3 which connect it to a three phase source of electrical power and which may be connected to a motor 37 which drives the pump 35. To start the motor 37 the operator will push a normally open switch button 38 which will close a circuit through a normally closed stop switch 39 in circuit with the contacts of an overload relay 40 to energize the coil of starting relay 41; the circuit, of course, extending from one of the buses L1 to a bus L3 connected to the main lines L1 and L3 through a three pole disconnect switch. An obvious holding circuit is provided for the relay 41 which includes the normally closed stop switch 39. Thus by opening said normally closed switch 39 the relay 41 may be deenergized to stop the motor 37 and pump 35. Indicator light 42 is controlled by the relay 41 so that it is energized whenever relay 41 is energized.

When the pump 35 is in operation to deliver hydraulic fluid to the hydraulic system, a cycle of operation may be considered as starting by raising the ram or elevator 30 to receive an empty bucket 15. To accomplish this a normally open push button switch 43 is closed which closes a circuit to the solenoid S2 of a hydraulic valve 44 (see Fig. 4). Solenoid S2 when thus energized effects the actuation of the core of said valve 44 to expand or raise the ram, cylinder or elevator 30 in the following manner. Valve 44 may be a standard four-way valve with an open center position. As a consequence, hydraulic fluid which is delivered to the pressure pipe 36 (see Fig. 4) will flow through a solenoid operated valve 45 which is spring-biased to a position to connect line 36 with a feed line, pipe or conduit 46. Line 46 connects to the center feed port of valve 44 and when it is in its normal, neutral or central position it provides a no load by-pass by way of tank pipe or conduit 47.

When solenoid S2 is energized, as above mentioned, this no load by-pass normally provided by valve 44 is extinguished and the hydraulic fluid is diverted from the line 46 to a line, pipe or conduit 48 which leads through a valve 49 to the lower cylinder port of the ram or elevator 30. The conduit 46 also extends beyond the valve 44 to the top port of said cylinder of ram 30. Due, however, to the difference in area between the two sides of the piston of the ram 30, as provided by the piston rod 50 thereof, said ram or elevator 30 will lift or expand, the fluid above said piston being forced back into the pipe 46.

It may be stated that the valve 49 is a standard valve and is so constructed that fluid may flow freely through it toward the ram 30 while the reverse flow is held by a pressure relief check valve which will normally lock the ram 30 in any position to which it is adjusted. This check valve, however, will open in case pressure is supplied from the pump 35 to the line 46 if the line 48 is connected to drain. This condition will be effected by the energization of solenoid S1 to lower the elevator 30 as hereinafter described.

It is evident by reference to Fig. 5 of the drawings that the raising operation for the elevator 30 will take place only so long as the operator maintains the manual switch 43 closed. After the elevator 30 has been raised a desired amount its platen or head 31 will lift a slowly moving bucket 15 sufficiently to take the weight thereof from the elevator 10, 11, etc., so that the operator can unhook the bail 14 thereof from the chain and hook 13. An empty bucket is therefore sitting on the head or platen 31 of the elevator 30 which is located at the empty bucket position.

The operator then pushes a manual double contact switch 51 which has a pair of normally open contacts and a pair of normally closed contacts, thereby closing the normally open contacts and opening the normally closed contacts. Closing of the normally open contacts energizes relay CR1. Relay CR1 will remain energized over a holding circuit including a conductor 57, the upper normally closed contacts of relay CR5 and the upper normally open contacts of relay CR1 until elevator 30 is completely down or contracted. Relay CR1 energizes solenoid S1 directly over an obvious circuit. Solenoid S1 actuates the valve 44, as above described, to shut off the by-pass for the pump 35 normally provided by said valve 44 and to connect the pipe or line 46 with the drain pipe 47, thus contracting elevator 30.

The valve 44 when thus actuated also connects pressure pipe 46 with the port leading to a pipe, conduit or line 52 which leads to the feed port of a right-hand four-way valve 53 which controls ram or elevator 32. The feed port of this valve is normally closed; consequently under the assumed conditions this hydraulic pressure has no effect on elevator 32 at this time. Conduit 52 extends to the upper port of the cylinder 32 which provides pressure to overcome pressure relief valve 49 and contract elevator 30 as aforesaid.

When the elevator 30 is completely lowered, thus lowering empty bucket 15 into an empty bucket position on the turntable platform 22 where said bucket 15 is relieved from the head 31 of elevator 30, the normally open limit switch LS1 (see Figs. 4 and 5) is closed. This energizes relay CR2 over a circuit including now closed switch LS1, the upper normally closed contacts of a push button switch 54, the lower contacts of relay CR1 which are still closed when switch LS1 is thus closed, and the upper normally closed contacts of a relay CR3.

Relay CR2 upon energizing closes an obvious circuit to solenoid S4, this circuit including the normally closed lower contacts of switch 51 which will be closed upon elevator 30 reaching the bottom of its stroke. Solenoid S4 upon being energized actuates valve 53 to connect line 52 through a port leading to pipe, conduit or line 55 which extends to the lower port of the cylinder of elevator 32 through a valve 56 which is similar in construction and function to the valve 49 controlling said elevator 32 in the same manner that valve 49 controls elevator 30.

Due to the differential action on the piston of the elevator 32 provided by the above described actuation of valve 53, elevator 32 will raise or expand and will elevate a filled bucket 15 which is at the filled bucket position on the turntable 22. This filled bucket will be raised through one of the openings 20 and be elevated to a position where the operator can readily hook the bail 14 onto the chain and hook 13, it being understood that the bails 14 are provided with rigid rings which readily receive the hook 13.

To lower the ram or elevator 32 after the filled bucket 15 has been removed by the conveyor 10, 11, etc., the operator will manually close the normally open contacts of switch 54 which will energize relay CR3 through switch LS1 which is now closed and through the now closed but normally open contacts of limit switch LS3 which is controlled by the hydraulic motor 24 rotating the turntable. That is, the pinion gear of the motor 24 which meshes with the ring gear 25 carries an actuating cam which controls limit switch LS3 so that said gear will make one revolution whenever motor 24 is energized and then automatically shut off by operating limit switch LS3. As above mentioned, one revolution of this gear will produce a quarter of a revolution of turntable platform 22.

Relay CR3 upon being energized breaks the holding circuit for relay CR2 which drops out and de-energizes solenoid S4, allowing four-way valve 53 to return to its normal or neutral position. It also closes a holding circuit for itself over its second contact through now closed normally open contacts of switch LS3. It also energizes solenoid S5 which actuates the valve 53 to contract or lower the hydraulic ram 32. This lowering is effected since when solenoid S5 is energized the conduit or pipe 55 is connected to drain line, pipe or conduit 58. Since S1 is energized at this time, as previously described, under the control of relay CR1, the pressure in the line 52 will be adequate to overcome the spring check valve 56 and contract or lower the ram or elevator 32. This action is automatic and continues until said elevator is completely contracted with its head or platen below the turntable platform 22.

When thus contracted, elevator 32 will close normally open switch LS2 which will energize relay CR4 over an obvious circuit including the lower normally open contacts of now energized relay CR3.

It may be mentioned at this time that there is a hydraulic interlock provided as above described so that hydraulic fluid under pressure is delivered to the conduit 52 only when valve 44 is actuated to lower the ram 30. Thus it is impossible to elevate or expand the elevator or ram 32 except when elevator or ram 30 is contracted or lowered, since relay CR2 which controls S4 is only energized when limit switch LS1 is closed.

Relay CR4 upon energizing will energize solenoid S3 over an obvious circuit including its two upper contacts. Solenoid S3 controls the previously mentioned spring-biased valve 45 and diverts the fluid pressure in the line 36 from the pipe or conduit 46 to pipe, line or conduit 59. When pressure is thus present in line 59 it is thereby delivered to the hydraulic motor 24 and sets it to rotating, the return line from the hydraulic motor 24 being designated 60 and leading through a check valve 61 into the line 46 which is now connected by valve 45 to a drain line 62. The check valve 61 is merely a one-way check valve which prevents hydraulic fluid flowing from the pipe 46 to the pipe 60 but permits free flow of fluid in the reverse direction. Because of it the previously described presence of hydraulic fluid under pressure in the conduit 46 will not rotate the motor 24, while the presence of hydraulic fluid in conduit 59, with conduit 60 connected to tank through conduits 46 and 62 and valve 45, will provide for rotation of the motor 24 and the turntable platform 22. Turntable platform 22 is therefore always rotated in one direction which will be counter-clockwise, as viewed in Fig. 2 of the drawings.

Simultaneously with the energization of motor 24 and the consequent rotation of the turntable platform 22 90° the relay CR4 and its normally open bottom contacts will break the electrical circuit to the vibratory motor 19 of the conveyer 18. This will prevent any feeding of castings by the conveyer 18 while the turntable platform 22 is rotating.

It is, of course, evident that the 90° rotation of the turntable platform 22 is to deliver an empty bucket thereon from the empty bucket position, which is the top position of Fig. 2, to the bucket filling position, which is the left-hand position of Fig. 2, in which the bucket is located to receive castings from the vibratory conveyer 18. This rotation also simultaneously delivers a filled bucket 15 from the bucket filling position adjacent the conveyer 18 to the filled bucket position, which is the bottom position of Fig. 2, so that the filled bucket will be in position to be elevated by the elevator 32 as above described.

It may also be mentioned that the electrical circuit for the motor 19 of the conveyer 18 includes a manual switch 63 which will normally be closed upon starting of the pump driving motor 37 and a normally open switch LS4, as well as the normally closed contacts of relay CR4. Limit switch LS4 is mounted adjacent the bucket filling position and carries a flexible actuating arm which is adapted to be contacted by a bucket 15 on the turntable platform 22. It will be closed only when there is such a bucket 15 on the turntable platform 22 adjacent the bucket filling position.

Shortly after the motor 24 is energized and the turntable platform 22 begins to turn, the limit switch LS3 controlled by the cam on the pinion of motor 24, as above described, will actuate limit switch LS3 to close its normally closed contacts and open its normally open contacts. The normally open contacts of switch LS3 on opening de-energize the relay CR3 and its normally closed contatcs close to energize relay CR5 over an obvious circuit. Relay CR5 upon being energized breaks the previously mentioned holding circuit for relay CR1 over its upper contacts, thus dropping out relay CR1 which de-energizes solenoid S1 and returns the hydraulic valve 44 to its neutral by-passing position. At its lower normally closed contacts relay CR5 on being energized closes the holding circuit for the relay CR4 over an obvious path.

When the pinion gear on motor 24 has made one revolution its cam will actuate switch LS3 to close the normally open contacts thereof and open the normally closed contacts. Opening of the normally closed contacts will de-energize relay CR5 which will break the holding circuit of relay CR4 which will be de-energized because relay CR3 de-energized at this time either because the normally open contacts of switch 54 are opened or because the normally open contacts of LS3 are opened, as above described. This completes a cycle of operation and a new cycle may be initiated as was the cycle described.

It may be pointed out that there are a number of safety features included in the system of my invention. First of all, it is impossible to rotate or index the turntable platform 22 while either of the elevators 30 or 32 is up or expanded. It is to be noted that solenoid S3 controls the turntable motor 24. Solenoid S3 is energized when and only when relay CR4 is energized. Relay CR4 can only be energized when switch LS2 is closed which requires that the elevator 32 be down or contracted. Said relay CR4 can also only be energized when CR3 is energized or when CR5 is energized. CR5 can be energized only after the turntable platform 22 starts to rotate and the normally closed contacts of switch LS3 are closed. In other words, relay CR5 can not initiate energization of relay CR4. Relay CR3 which can initiate its energization, provided LS2 is closed, can only be energized when LS1 is closed. This requires that elevator 30 be in its lower or contracted position. Furthermore there is a hydraulic tie-up or interlock, which was above described, which prevents the elevation or raising of elevator 32 except when valve 44 is operated by a solenoid S1 under control of relay CR1. Solenoid S1 when energized, of course, controls valve 44 to lower or contract cylinder 30. It is only under this condition that hydraulic fluid is delivered to the pipe or line 52 to permit the elevation of elevator 32. In short, elevator 32 can only be elevated when elevator 30 is down.

As a second safety feature the elevators 30 and 32 can not raise while the turntable platform 22 is rotating or indexing. This is because rotation of motor 24 is governed by valve 45 controlled by solenoid S3. When valve 45 is energized so as to supply hydraulic fluid to rotate motor 24, line or conduit 46 is connected to drain line 62. Thus there is no hydraulic fluid under pressure in the line 46 which is an essential condition to the elevation or expansion of either of the hydraulic elevators 30, 32.

The vibratory feeder can be stopped at any time independent of the rest of the apparatus by the operator opening the switch 63 which may be simply a standard snap switch mounted in the switch box 33.

From the above description it is evident that I have produced a very flexible apparatus or system for delivering cleaned castings to a trolley conveyer system after they have been freed of the mold sand, the system being particularly easy to operate and involving a minimum of manual labor consistent with an efficient handling of the castings.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A foundry system for handling castings including a trolley system adapted to carry removable buckets to and from a turntable position, removable buckets for said system, a turntable positioned below said trolley constructed to support removable buckets at definite positions including an empty bucket position, a loaded bucket position and a bucket loading position between them, said first two positions being diametrically opposite each other, means for lowering a released bucket to said empty bucket position and on said turntable, means for loading castings to the bucket on said turntable which is in the bucket loading position, means for elevating the bucket at the loaded bucket position whereby it may be attached to said trolley system, said lowering and elevating means including upwardly and downwardly movable rams extending through holes in said turntable over which holes the buckets sit, and means for rotating said turntable to move an empty bucket from the empty bucket position to the bucket loading position and simultaneously move a loaded bucket from the bucket loading position to the loaded bucket position.

2. A foundry system for handling castings including a trolley system adapted to carry removable buckets to and from a turntable position, removable buckets for said system, a turntable positioned below said trolley constructed to support removable buckets at definite positions including an empty bucket position, a loaded bucket position and a bucket loading position between them, means for lowering a released bucket to said empty bucket position and on said turntable, means for loading castings to the bucket on said turntable which is in the bucket loading position, means for elevating the bucket at the loaded bucket position whereby it may be attached to said trolley system, said lowering and elevating means including upwardly and downwardly movable rams extending through holes in said turntable over which holes the buckets sit, and means for rotating said turntable to move an empty bucket from the empty bucket position to the bucket loading position and simultaneously move a loaded bucket from the bucket loading position to the loaded bucket position.

3. A foundry system for handling castings including a trolley system adapted to carry removable buckets to and from a turntable position, removable buckets for said system, a turntable positioned below said trolley constructed to support removable buckets at definite positions including an empty bucket position, a loaded bucket position and a bucket loading position between them, means for lowering a released bucket to said empty bucket position and on said turntable, means for loading castings to the bucket on said turntable which is in the bucket loading position, means for elevating the bucket at the loaded bucket position whereby it may be attached to said trolley system, and switch means preventing operation of said casting loading means except when a bucket is in said bucket loading position and said turntable is stationary.

4. A foundry system for handling castings including a trolley system adapted to carry removable buckets to and from a turntable position, removable buckets for said system, a turntable positioned below said trolley constructed to support removable buckets at definite positions including an empty bucket position, a loaded bucket position and a bucket loading position between them, means for lowering a released bucket to said empty bucket position and on said turntable, means for loading castings to the bucket on said turntable which is in the bucket loading position, means for elevating the bucket at the loaded bucket position whereby it may be attached to said trolley system, and control mechanism operable to prevent raising or lowering of said buckets except when said turntable is stationary.

5. A foundry system for handling castings including a trolley system adapted to carry removable buckets to and from a turntable position, removable buckets for said system, a turntable positioned below said trolley constructed to support removable buckets at definite positions including an empty bucket position, a loaded bucket position and a bucket loading position between them, means for lowering a released bucket to said empty bucket position and on said turntable, means for loading castings to the bucket on said turntable which is in the bucket loading position, means for elevating the bucket at the loaded bucket position whereby it may be attached to said trolley system, said lowering and elevating means including upwardly and downwardly movable rams extending through holes in said turntable over which holes the buckets sit, and means for rotating said turntable to move an empty bucket from the empty bucket position to the bucket loading position and simultaneously move a loaded bucket from the bucket loading position to the loaded bucket position, said ram elevating and lowering means including hydraulic cylinders and control valves therefor.

ALTON E. MOSER.

REFERENCES CITED

The following references are of record in the file of this patent:

UNITED STATES PATENTS

| Number | Name | Date |
| --- | --- | --- |
| 903,423 | Williams et al. | Nov. 10, 1908 |
| 2,451,975 | Rayburn et al. | Oct. 19, 1948 |